United States Patent
Lee et al.

(10) Patent No.: US 12,332,448 B2
(45) Date of Patent: Jun. 17, 2025

(54) WAVEGUIDE-TYPE DISPLAY APPARATUS

(71) Applicant: SAMSUNG ELECTRONICS CO., LTD., Suwon-si (KR)

(72) Inventors: Changkun Lee, Seoul (KR); Seokil Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 547 days.

(21) Appl. No.: 17/744,800

(22) Filed: May 16, 2022

(65) Prior Publication Data

US 2023/0168509 A1 Jun. 1, 2023

(30) Foreign Application Priority Data

Dec. 1, 2021 (KR) .................. 10-2021-0170363

(51) Int. Cl.
*G02B 27/01* (2006.01)
*F21V 8/00* (2006.01)

(52) U.S. Cl.
CPC ....... *G02B 27/0172* (2013.01); *G02B 6/0026* (2013.01); *G02B 6/0036* (2013.01); *G02B 6/0065* (2013.01)

(58) Field of Classification Search
CPC ........ G02B 27/0172; G02B 2027/0125; G02B 2027/0123; G02B 6/0026; G02B 27/0081; G02B 27/0075
See application file for complete search history.

(56) References Cited

U.S. PATENT DOCUMENTS

| | | | |
|---|---|---|---|
| 11,137,608 | B2 | 10/2021 | Yang |
| 2018/0188441 | A1 | 7/2018 | Fattal |
| 2019/0293939 | A1 | 9/2019 | Sluka |
| 2020/0183152 | A1 | 6/2020 | Pennell et al. |
| 2021/0063742 | A1 | 3/2021 | Lee et al. |
| 2021/0191129 | A1 | 6/2021 | Lee et al. |
| 2022/0299939 | A1 | 9/2022 | Moon et al. |

FOREIGN PATENT DOCUMENTS

| | | |
|---|---|---|
| CN | 111175975 A | 5/2020 |
| EP | 3792681 A1 | 3/2021 |
| JP | 2018-533047 A | 11/2018 |
| KR | 1020190106947 A | 9/2019 |
| KR | 1020210036246 A | 4/2021 |
| KR | 1020210081211 A | 7/2021 |
| KR | 1020220131741 A | 9/2022 |
| RU | 2752556 C1 | 7/2021 |

OTHER PUBLICATIONS

Examination Report issued Apr. 18, 2023 issued by the European Patent Office for EP Patent Application No. 22189303.5.

*Primary Examiner* — Ryan D Howard
(74) *Attorney, Agent, or Firm* — Sughrue Mion, PLLC

(57) ABSTRACT

A display apparatus includes a waveguide; an input coupler on the waveguide and configured to introduce light containing an image into the waveguide; and an output coupler on the waveguide and configured to output light traveling in the waveguide to the outside of the waveguide, wherein the output coupler includes a plurality of first diffraction grating elements arranged apart from each other and configured to diffract a first light portion in a first wavelength band among the light traveling in the waveguide.

19 Claims, 12 Drawing Sheets

WAVEGUIDE-TYPE DISPLAY APPARATUS

CROSS-REFERENCE TO RELATED APPLICATION

This application is based on and claims priority under 35 U.S.C. § 119 to Korean Patent Application No. 10-2021-0170363, filed on Dec. 1, 2021, in the Korean Intellectual Property Office, the disclosure of which is incorporated by reference herein in its entirety.

BACKGROUND

1. Field

The disclosure relates to a waveguide-type display apparatus, and more particularly, to a waveguide-type display apparatus having an extended depth of focus.

2. Description of Related Art

Virtual reality refers to a technique for enabling users to have a realistic experience in a virtual world created by a computer. Augmented reality refers to a technique for combining virtual images with a physical environment or space of the real world. Near-eye displays for implementing virtual reality or augmented reality are configured to reproduce virtual images in a space by combining optical and stereoscopic images. Resolution and processing are key factors in such near-eye displays.

Near-eye display apparatuses provide image information of a light source by using a very thin waveguide and a very thin diffractive optical device capable of changing the direction of light in an intended direction, and may thus have a small volume. In addition to having a very small thickness, the diffractive optical device may have selectivity to light incident at a certain angle and having a certain wavelength. Based on the characteristics described above, the diffractive optical device may be designed to transmit light from real objects while manipulating only light traveling within the waveguide.

SUMMARY

Light propagating within a waveguide by total reflection is output as parallel light rays while being diffracted by an output coupler, and thus a display apparatus including such a waveguide may provide a wide eye box.

However, because parallel light rays have an infinite depth position, people having normal eyesight may not clearly view images formed by parallel light rays.

Provided are waveguide-type display apparatuses having an increased depth of focus.

Additional aspects will be set forth in part in the description which follows and, in part, will be apparent from the description, or may be learned by practice of embodiments of the disclosure.

In accordance with an aspect of the disclosure, a display apparatus includes a waveguide; an input coupler on the waveguide, the input coupler being configured to introduce light corresponding to an image into the waveguide; and an output coupler on the waveguide, the output coupler being configured to output light traveling within the waveguide to an outside of the waveguide, wherein the output coupler includes a plurality of first diffraction grating elements arranged apart from each other, the plurality of first diffraction grating elements being configured to diffract a first light portion in a first wavelength band among the light traveling within the waveguide, and wherein a gap between adjacent first diffraction grating elements from among the plurality of first diffraction grating elements is greater than a width and a length of each of the plurality of first diffraction grating elements.

The gap between the adjacent first diffraction grating elements may be about two times to about five times at least one of the width and the length of each of the plurality of first diffraction grating elements.

At least one of the width and the length of each of the plurality of first diffraction grating elements may be about 100 μm to about 2 mm.

The plurality of first diffraction grating elements may be arranged such that a pitch between the adjacent first diffraction grating elements arranged in a center region of the output coupler is less than a pitch between the adjacent first diffraction grating elements arranged in a peripheral region of the output coupler.

A thickness of each of first diffraction grating elements arranged in a center region of the output coupler may be greater than a thickness of each of first diffraction grating elements arranged in a peripheral region of the output coupler.

Each of the plurality of first diffraction grating elements may diffract the first light portion into a plurality of diffraction orders such that the first light portion is output in a plurality of directions.

A size of a light beam, which is incident on a user's pupil among light diffracted by the output coupler, may be less than a size of the user's pupil.

The output coupler may further include a plurality of second diffraction grating elements arranged apart from each other, the plurality of second diffraction grating elements being configured to diffract, among the light traveling within the waveguide, a second light portion in a second wavelength band different from the first wavelength band; and a plurality of third diffraction grating elements arranged apart from each other, the plurality of third diffraction grating elements being configured to diffract, among the light traveling within the waveguide, a third light portion in a third wavelength band different from the first wavelength band and the second wavelength band.

The plurality of first diffraction grating elements, the plurality of second diffraction grating elements, and the plurality of third diffraction grating elements may be alternatingly and repeatedly arranged.

A gap between each first diffraction grating element from among the plurality of first diffraction grating elements and a respective adjacent second diffraction grating element from among the plurality of second diffraction grating elements may be less than a width of each of the plurality of first and second diffraction grating elements.

Each diffraction grating element of the plurality of first diffraction grating elements, the plurality of second diffraction grating elements, and the plurality of third diffraction grating elements may be directly in contact with the waveguide.

Each diffraction grating element of the plurality of first diffraction grating elements, the plurality of second diffraction grating elements, and the plurality of third diffraction grating elements may be configured to diffract red light, green light, or blue light.

The output coupler may further include a plurality of fourth diffraction grating elements arranged apart from each other, the plurality of fourth diffraction grating elements being configured to diffract the first light portion, wherein the plurality of first diffraction grating elements outputs the first light portion at a first viewing angle, and the plurality of fourth diffraction grating elements may output the first light portion at a second viewing angle different from the first viewing angle.

The plurality of first diffraction grating elements may be configured to diffract the first light portion into 0th and positive diffraction orders such that the first light portion is output at the first viewing angle, and the plurality of fourth diffraction grating elements may be configured to diffract the first light portion into 0th and negative diffraction orders such that the first light portion is output at the second viewing angle.

The output coupler may be on a curved surface of the waveguide.

At least one of the plurality of first diffraction grating elements may have any one from among a circular cross-sectional shape, an elliptical cross-sectional shape, and a polygonal cross-sectional shape.

The plurality of first diffraction grating elements may be nano-imprinted on the waveguide.

The waveguide may transmit light corresponding to an external environment.

The display apparatus may further include an image module configured to provide the light corresponding to the image to the input coupler.

The display apparatus may include a near-eye display apparatus.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
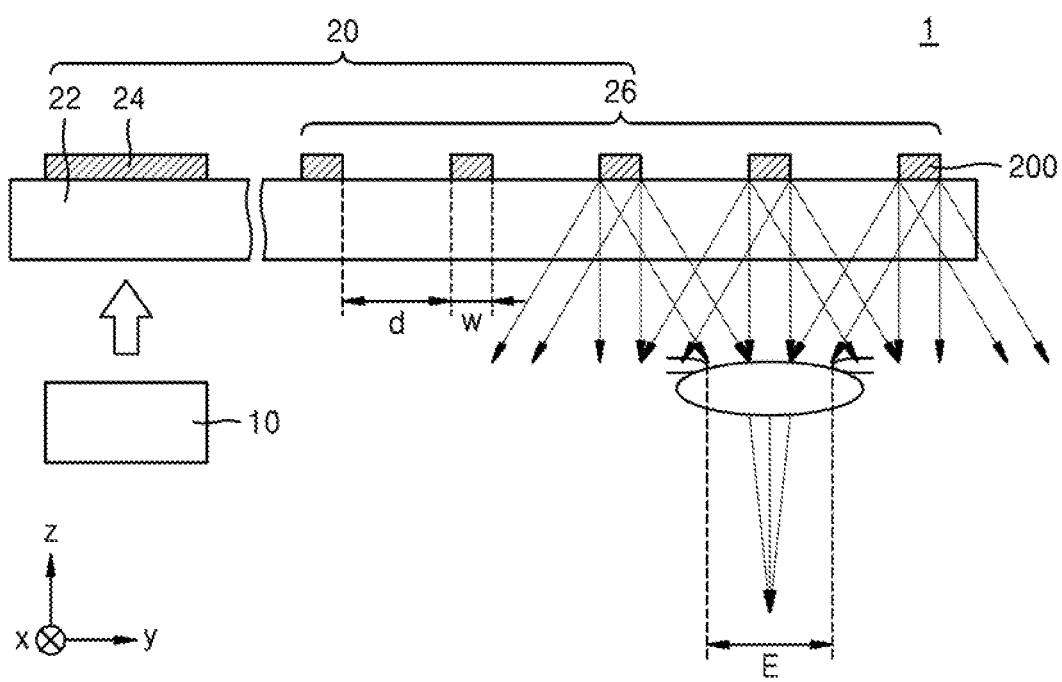
FIG. 1 is a view schematically illustrating a waveguide-type display apparatus according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments will be described with reference to the accompanying drawings. The following descriptions of the embodiments are for specifically explaining technical ideas and should not be construed as limiting the scope of the disclosure. Modifications or changes that could be easily made from the embodiments by those of ordinary skill in the art should be construed as being included in the scope of the disclosure.

In the following descriptions of the embodiments, expressions or terms such as "constituted by," "formed by," "include," "comprise," "including," and "comprising" should not be construed as always including all specified elements, processes, or operations, but may be construed as not including some of the specified elements, processes, or operations, or further including other elements, processes, or operations. In the disclosure, terms such as "unit" or "module" may be used to denote a unit that has at least one function or operation and is implemented with hardware, software, or a combination of hardware and software.

In addition, although terms such as "first" and "second" are used to describe various elements, these elements should not be limited by these terms. These terms are only used to distinguish one element from another element.

In the following description, when an element is referred to as being "above" or "on" another element, it may be directly on an upper, lower, left, or right side of the other element while making contact with the other element or may be above an upper, lower, left, or right side of the other element without making contact with the other element. Embodiments will now be described with reference to the accompanying drawings, but the examples are only examples.

FIG. 1 is a view schematically illustrating a waveguide-type display apparatus 1 (e.g., a display apparatus) according to an embodiment. The waveguide-type display apparatus 1 may be a near-eye display apparatus.

Referring to FIG. 1, the waveguide-type display apparatus 1 may include: an image module 10 configured to provide "light corresponding to an image" (hereinafter, it may be simply referred to as "image" or "light"); and an optical coupler 20 configured to provide light by combining the light corresponding to the image provided from the image module 10 with light corresponding to a real environment.

The image module 10 may provide light corresponding to an image. The image module 10 may output light corresponding to an image in response to an electrical signal. The image module 10 may include, for example, an LCD, a liquid crystal on silicon (LCoS), an OLED display, or an LED display.

The optical coupler 20 may include: a waveguide 22 in which light corresponding to an image propagates while being totally internally reflected and which transmits light corresponding to an external environment; an input coupler 24 by which the light corresponding to the image and coming from the imaging module 10 is introduced into the waveguide 22; and an output coupler 26 by which the light corresponding to the image and traveling within the waveguide 22 is output to the outside of the waveguide 22.

In the waveguide 22, the light corresponding to the image may propagate by total reflection. The waveguide 22 may include a transparent member such as a glass member or a transparent plastic member.

The light corresponding to the image that is incident on the input coupler 24 is diffracted by the input coupler 24 such that the light corresponding to the image may propagate in the waveguide 22 in the length direction of the waveguide 22, for example, in a y-direction as shown in FIG. 1. The light corresponding to the image may be perpendicularly or obliquely incident on the input coupler 24. The input coupler 24 may be a diffractive optical device or a holographic optical device, which is configured to diffract an incident image.

When the light corresponding to the image propagating in the waveguide 22 is incident on the output coupler 26, the output coupler 26 diffracts and outputs the light to the eyes of a user which are located outside the waveguide 22. The light totally internally reflected within the waveguide 22 may be output as parallel light rays from the output coupler 26, and thus the waveguide-type display apparatus 1 may form a wide eye box.

According to an embodiment, the output coupler 26 may have a pinhole array structure. Owing to the pinhole array structure, the aperture of the output coupler 26 may be reduced. When the aperture of the output coupler 26 is small, the output coupler 26 may have an extended depth of focus.

According to an embodiment, the output coupler 26 may include a plurality of diffraction grating elements 200, which are apart from each other and configured to diffract incident light. The gap d between adjacent diffraction grating elements from among the diffraction grating elements 200 may be greater than the width w and the length of the diffraction grating elements 200. When light propagating within the waveguide 22 is incident on the diffraction grating elements 200, the diffraction grating elements 200 may output the light in a plurality of directions by diffracting the light into a plurality of diffraction orders.

Incident light is diffracted and output from the diffraction grating elements 200, and thus the diffraction grating elements 200 may serve as an aperture for light. The diffraction grating elements 200 are apart from each other, and the gap d between the diffraction grating elements 200 is greater than the width w and the length of the diffraction grating elements 200, such that the output coupler 26 may have a pinhole array structure including a group of small pinholes.

The gap d between the diffraction grating elements 200 may be about two times to about five times at least one of the width w and the length of the diffraction grating elements 200. For example, at least one of the width w and the length of the diffraction grating elements 200 may be about 100 μm to about 2 mm, and the gap d between the diffraction grating elements 200 may be about 300 μm to about 10 mm.

According to an embodiment, at least one of the diffraction grating elements 200 may have a circular or elliptical cross-sectional shape, or a polygonal cross-sectional shape such as a quadrangular or hexagonal cross-sectional shape. The cross-sectional shape of a user's pupil E is circular, and thus the cross-sectional shape of the diffraction grating elements 200 may be circular. Alternatively, the diffraction grating elements 200 may have a hexagonal cross-sectional shape, and in this case, the gap d between the diffraction grating elements 200 may be constant. However, embodiments are not limited thereto. The diffraction grating elements 200 may have various cross-sectional shapes, and for example, the diffraction grating elements 200 may have different cross-sectional shapes from each other.

The pitch P (the sum of the gap d and the width w) between the diffraction grating elements 200 may be constant or may vary depending on the position in the output coupler 26.

Figure 2A:
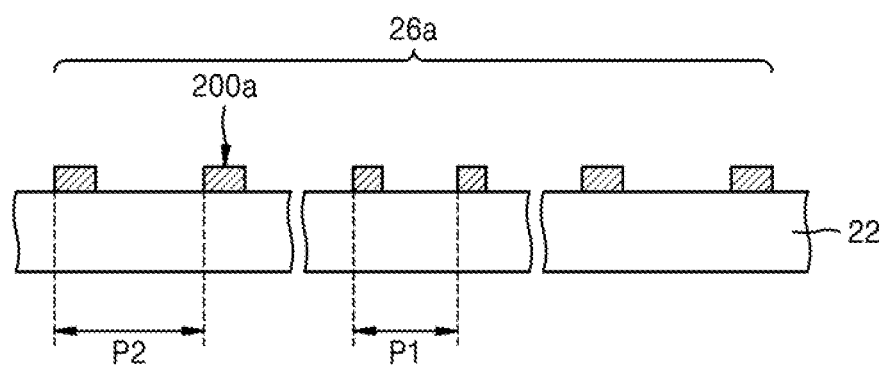
FIG. 2A is a view illustrating an output coupler in which diffraction grating elements are arranged with a varying pitch according to an embodiment.

FIG. 2A is a view illustrating an output coupler 26a in which diffraction grating elements 200a are arranged with a varying pitch according to an embodiment. Referring to FIG. 2A, the pitch P1 between adjacent diffraction grating elements 200a arranged in a center region of the output coupler 26a may be different from the pitch P2 between adjacent diffraction grating elements 200a arranged in a peripheral region of the output coupler 26a. For example, the pitch P1 between the diffraction grating elements 200a arranged in the center region of the output coupler 26a may be less than the pitch P2 between the diffraction grating elements 200a arranged in the peripheral region of the output coupler 26a. Alternatively, the pitch P between the diffraction grating elements 200a may gradually decrease in a direction from the peripheral region to the center region of the output coupler 26a.

In general, the output coupler 26a is manufactured such that the center of the output coupler 26a and a user's pupil E may be aligned with each other, and thus when the pitch P1 between the diffraction grating elements 200a arranged in the center region of the output coupler 26a is less than the pitch P2 between the diffraction grating elements 200a arranged in the peripheral region of the output coupler 26a, the diffraction efficiency of the output coupler 26a may be high.

Figure 2B:
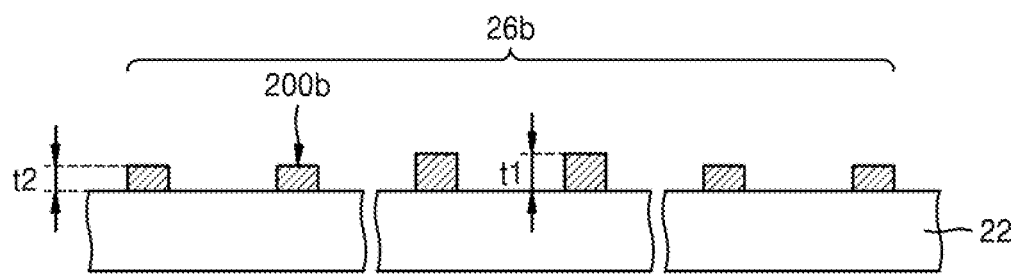
FIG. 2B is a view illustrating an output coupler in which diffraction grating elements have different thicknesses according to an embodiment.

FIG. 2B is a view illustrating an output coupler 26b including diffraction grating elements 200b having different thicknesses. Referring to FIG. 2B, the thickness t1 of diffraction grating elements 200b arranged in a center region of the output coupler 26b may be different from the thickness t2 of diffraction grating elements 200b arranged in a peripheral region of the output coupler 26b. For example, the thickness t1 of the diffraction grating elements 200b arranged in the center region of the output coupler 26b may be greater than the thickness t2 of the diffraction grating elements 200b arranged in the peripheral region of the output coupler 26b. Alternatively, the thickness t of the diffraction grating elements 200b may gradually increase in a direction from the peripheral region to the center region of the output coupler 26b. In general, when the thickness t of the diffraction grating elements 200b is greater in the center region of the output coupler 26b than in other regions of the output coupler 26b, the diffraction efficiency of the output coupler 26b may be high.

According to an embodiment, the diffraction grating elements 200 may be nano-imprinted on the waveguide 22. In this case, because the diffraction grating elements 200b are nano-imprinted on the waveguide 22, the optical coupler 20 may be easily manufactured.

Figure 3:
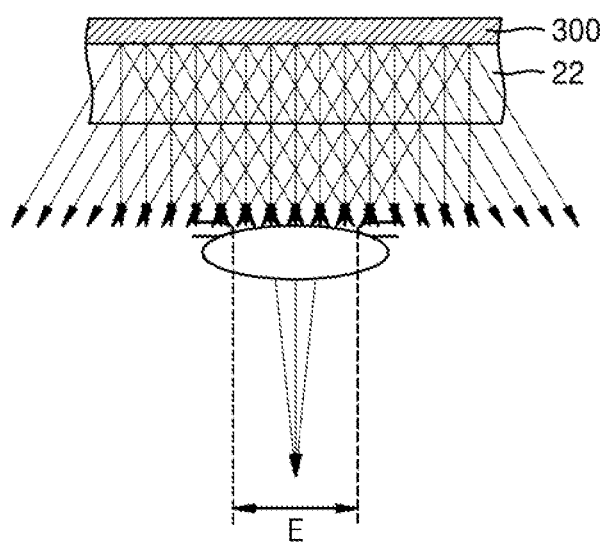
FIG. 3 is a view illustrating an optical coupler including a plate-shaped output coupler according to a comparative example.

FIG. 3 is a view illustrating an optical coupler including a plate-shaped output coupler 300 according to a comparative example. Referring to FIG. 3, because the output coupler 300 has a plate shape, the same field components of light diffracted from the output coupler 300 travel parallel to each other. In addition, light corresponding to an image is incident on the entirety of a pupil E of a user, and thus the depth of focus is very small. Thus, the user may recognize that the image corresponding to the light is reproduced at an infinite depth (or distance). That is, it may be considered that the image is focused at infinity.

In general, it is not easy for a user to observe an image focused at infinity. That is, an image focused to infinity may have poor sharpness. Therefore, in waveguide-type display apparatuses of the related art, an optical lens may be attached to the front or rear of a waveguide. For example, a concave lens may be disposed between a waveguide and a user's eye to bring the depth of an image from infinity to a finite distance. To set the finite distance to be shorter, a more powerful concave lens, that is, a thicker concave lens may be necessary.

In addition, because the concave lens decreases even the focal length of light corresponding to an external foreground, the user may also recognize the external foreground in a size-reduced or distorted state. Therefore, a convex lens capable of canceling the power of the concave lens may be further arranged between the waveguide and the external foreground to compensate for the size reduction or distortion of the external foreground. That is, because a pair of concave and convex lenses are arranged on both sides of a waveguide of an optical coupler, the optical coupler may be thick and heavy.

Figure 4A:
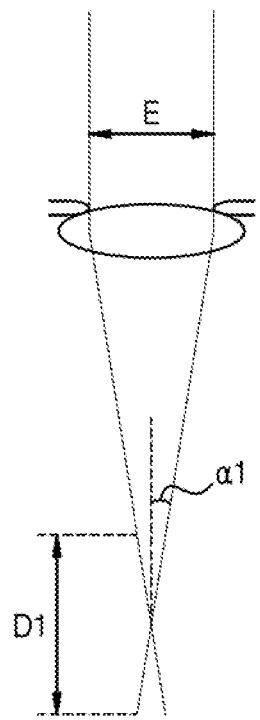
FIGS. 4A and 4B are views illustrating a relationship between the field of light incident on a pupil and a depth of field.
Figure 4B:
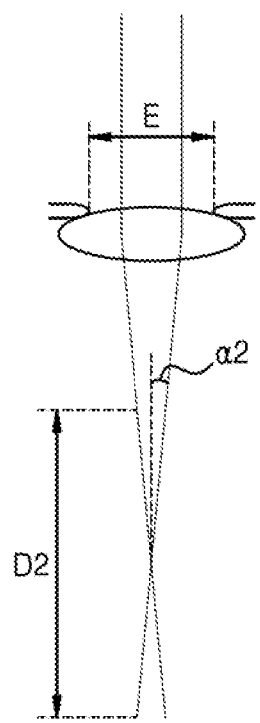

FIGS. 4A and 4B are views illustrating a relationship between the field of light incident on a pupil E and a depth of focus.

A depth D of focus may vary according to the field of light covering the pupil E. Referring to FIG. 4A, the same field of light output from an output coupler may be incident on the entire area of the pupil E. Because the area of the pupil E on which light is incident is large, an angular component αl of focused light is great, resulting in a small depth D1 of focus.

Conversely, referring to FIG. 4B, the same field of light output from the output coupler may be incident on only a portion of the pupil E. Because the same field of light is incident on a portion of the pupil E, an angular component α2 of focused light is small. As the angular component α2 decreases, a depth D2 of focus may increase.

Referring back to FIG. 1, the output coupler 26 having a pinhole array structure may be constructed such that light may be incident on only a portion of a pupil E. Because light is incident on only a portion of the pupil E, the depth D of focus may increase, and thus a user may feel that images diffracted by the output coupler 26 having a pinhole array structure are reproduced at a distance shorter than infinity.

Figure 5:
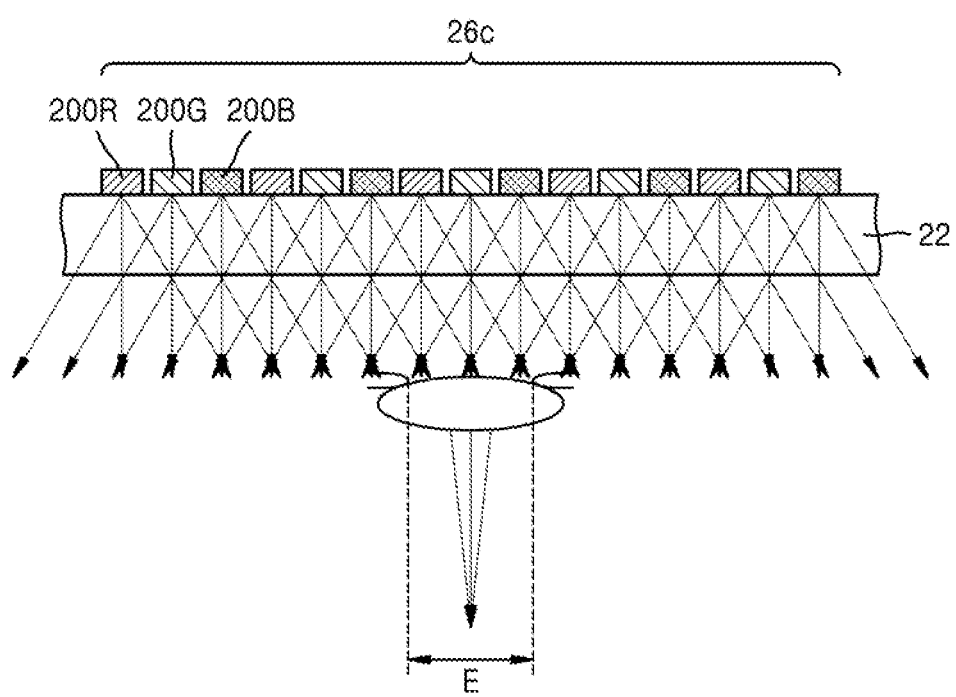
FIG. 5 is a view illustrating an optical coupler including a wavelength-selective output coupler according to an embodiment.

The output coupler 26 having a pinhole array structure may be constructed to diffract light according to the wavelength of light. FIG. 5 is a view illustrating an optical coupler including a wavelength-selective output coupler 26c according to an embodiment. Referring to FIG. 5, the wavelength-selective output coupler 26c may include, on a waveguide 22, a plurality of first diffraction grating elements 200R, a plurality of second diffraction grating elements 200G, and a plurality of third diffraction grating elements 200B, wherein the first diffraction grating elements 200R may be configured to diffract and output a first light portion in a first wavelength band among incident light, the second diffraction grating elements 200G may be configured to diffract a second light portion in a second wavelength band among the incident light, and the third diffraction grating elements 200B may be configured to diffract a third light portion in a third wavelength band among the incident light. The first to third wavelength bands may be different from each other. For example, the first to third light portions may respectively be red light, green light, and blue light.

According to an embodiment, the first to third diffraction grating elements 200R, 200G, and 200B may be apart from each other. That is, each of the first diffraction grating elements 200R may be apart from each other first diffraction grating element 200R, each of the second diffraction grating elements 200G may be apart from each other second diffraction grating element 200G, and each of the third diffraction grating elements 200B may be apart from each other third diffraction grating element 200B.

According to an embodiment, the first to third diffraction grating elements 200R, 200G, and 200B may be alternately arranged one by one in one direction. For example, the first diffraction grating elements 200R, the second diffraction grating elements 200G, and the third diffraction grating elements 200B may be repeatedly arranged in the length and width directions of the waveguide 22. The first to third diffraction grating elements 200R, 200G, and 200B may be arranged each in contact with the waveguide 22. FIG. 5 illustrates that the first to third diffraction grating elements 200R, 200G, and 200B are apart from each other. However, embodiments are not limited thereto. For example, the second diffraction grating elements 200G may be in contact with the first diffraction grating elements 200R and the third diffraction grating elements 200B.

The first to third diffraction grating elements 200R, 200G, and 200B may be arranged in the same manner and structure as those described with reference to FIG. 1.

For example, the gap between adjacent first diffraction grating elements 200R may be greater than the width and the length of the first diffraction grating elements 200R. The gap between adjacent first diffraction grating elements 200R may be about two times to about five times at least one of the width and the length of the first diffraction grating elements 200R. For example, at least one of the width and the length of the first diffraction grating elements 200R may be about 100 µm to about 2 mm, and the gap between adjacent first diffraction grating elements 200R may be about 300 µm to about 10 mm. For example, a gap between each first diffraction grating element 200R and adjacent second and third diffraction grating elements 200G and 200B may be less than a width of each of the first to third diffraction grating elements 200R, 200G, and 200B.

According to an embodiment, at least one of the first diffraction grating elements 200R may have a circular or elliptical cross-sectional shape, or a polygonal cross-sectional shape such as a quadrangular or hexagonal cross-sectional shape. The first diffraction grating elements 200R may be arranged with a constant pitch. However, embodiments are not limited thereto. The pitch between first diffraction grating elements 200R arranged in a center region of the wavelength-selective output coupler 26c may be different from the pitch between first diffraction grating elements 200R arranged in a peripheral region of the wavelength-selective output coupler 26c. For example, the pitch between the first diffraction grating elements 200R arranged in the center region of the wavelength-selective output coupler 26c may be less than the pitch between the first diffraction grating elements 200R arranged in the peripheral region of the wavelength-selective output coupler 26c. For example, the pitch between the first diffraction grating elements 200R may gradually decrease in a direction from the peripheral region to the center region of the wavelength-selective output coupler 26c.

In addition, the thickness of the first diffraction grating elements 200R arranged in the center region of the wavelength-selective output coupler 26c may be different from the thickness of the first diffraction grating elements 200R arranged in the peripheral region of the wavelength-selective output coupler 26c. For example, the thickness of the first diffraction grating elements 200R arranged in the center region of the wavelength-selective output coupler 26c may be greater than the thickness of the first diffraction grating elements 200R arranged in the peripheral region of the wavelength-selective output coupler 26c. For example, the thickness of the first diffraction grating elements 200R may gradually increase in a direction from the peripheral region to the center region of the wavelength-selective output coupler 26c.

The second and third diffraction grating elements 200G and 200B may be arranged in the same manner and structure as the first diffraction grating elements 200R, and thus descriptions thereof will be omitted.

Because each of the first to third diffraction grating elements 200R, 200G, and 200B diffracts one of the first to third light portions in a wavelength-selective manner, the size of the first light portion incident on the user's pupil (E) may be smaller than the size of a pupil E, and each of the sizes of the second and third light portions may also be smaller than the size of the pupil E. Thus, the first to third diffraction grating elements 200R, 200G, and 200B may increase the sharpness of images by increasing the depth of focus.

In addition, because spaces of a pinhole array structure (e.g., a pinhole array structure corresponding to first diffraction grating elements 200R) are filled with other pinhole structures (e.g., pinhole structures corresponding to second and third diffraction grating elements 200G and 200B) acting in different wavelength bands in addition to the increased depth of focus, the size of the optical coupler may not increase due to the arrangement of the first to third diffraction grating elements 200R, 200G, and 200B.

Figure 6:
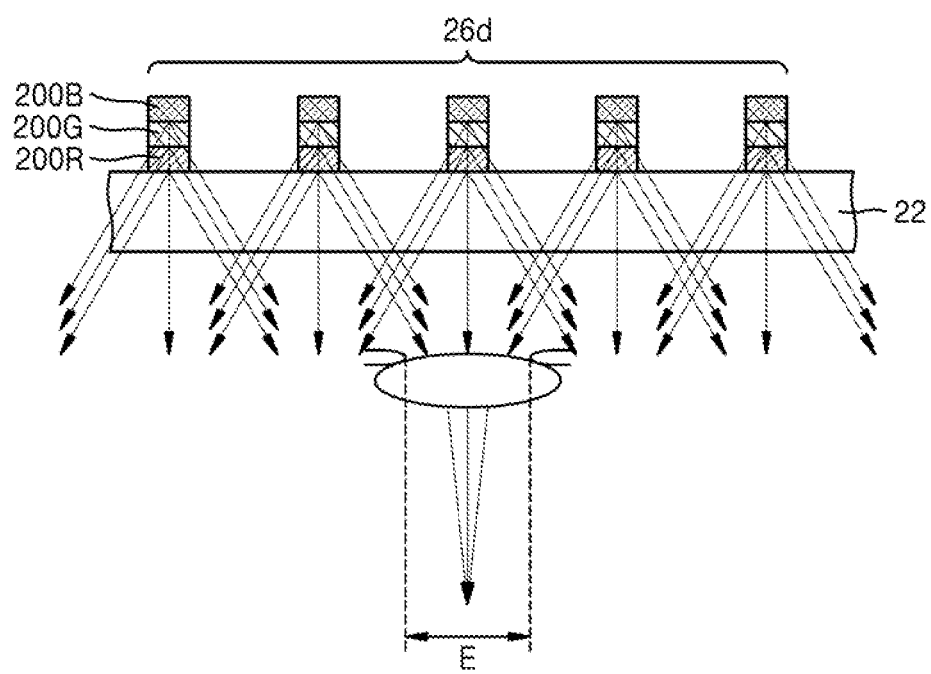
FIG. 6 is a view illustrating an optical coupler including a wavelength-selective output coupler according to an embodiment.

FIG. 6 is a view illustrating an optical coupler including a wavelength-selective output coupler 26d according to an embodiment. Comparing FIG. 6 with FIG. 5, first to third diffraction grating elements 200R, 200G, and 200B may be sequentially arranged in the thickness direction of a waveguide 22. This may increase the volume of the optical coupler, but may further increase the sharpness of images.

Figure 7:
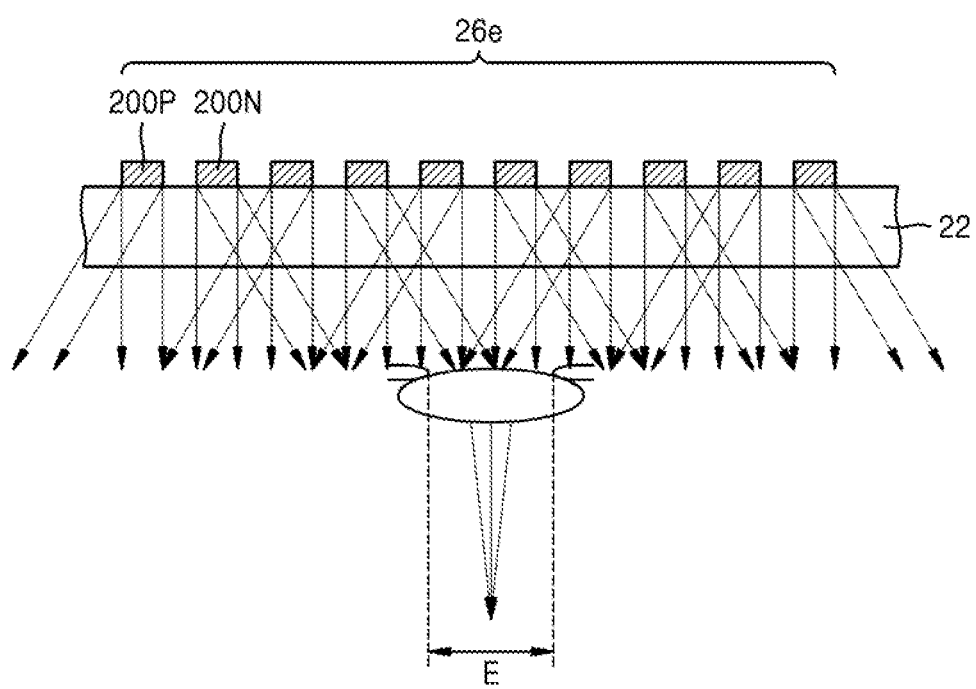
FIG. 7 is a view illustrating an optical coupler including an output coupler capable of providing different viewing angles according to an embodiment.

FIG. 7 is a view illustrating an optical coupler including an output coupler 26e capable of providing different viewing angles according to an embodiment. Referring to FIG. 7, the output coupler 26e may include: a plurality of fourth diffraction grating elements 200P, which are apart from each other and configured to diffract light at a first viewing angle; and a plurality of fifth diffraction grating elements 200N, which are apart from each other and configured to diffract light at a second viewing angle different from the first viewing angle. For example, the fourth diffraction grating elements 200P may diffract light into 0th and positive diffraction orders (for example, order +1), and the fifth diffraction grating elements 200N may diffract light into 0th and negative diffraction orders (for example, order −1). In this case, diffraction grating elements may be formed differently for different viewing angles, and thus the output coupler 26e may be easily manufactured. The output coupler 26e has a pinhole array structure for each viewing angle, and thus may increase the depth of focus.

Figure 8:
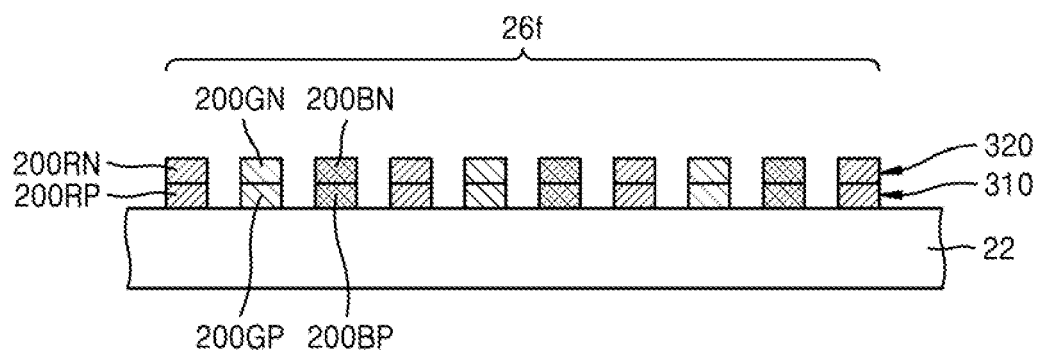
FIGS. 8 and 9 are views illustrating arrangements of output couplers capable of selecting wavelengths and providing different viewing angles according to various embodiments.
Figure 9:
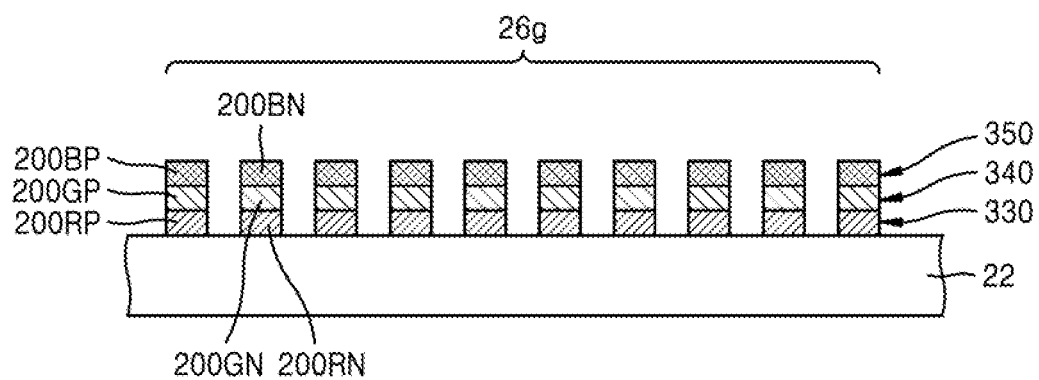

FIGS. 8 and 9 are views illustrating arrangements of output couplers 26f and 26g capable of selecting wavelengths and providing different viewing angles according to various embodiments.

Referring to FIG. 8, the output coupler 26f may have a two-layer structure. For example, the output coupler 26f may include: a first output coupler 310 provided in contact with a waveguide 22 and configured to diffract light at a first viewing angle; and a second output coupler 320 disposed on the first output coupler 310 and configured to diffract light at a second viewing angle. In addition, the first output coupler 310 may include: diffraction grating elements 200RP configured to diffract a first light portion in a first wavelength band; diffraction grating elements 200GP configured to diffract a second light portion in a second wavelength band; and diffraction grating elements 200BP configured to diffract a third light portion in a third wavelength band. The second output coupler 320 may include diffraction grating elements 200RN configured to diffract the first light portion in the first wavelength band; diffraction grating elements 200GN configured to diffract the second light portion in the second wavelength band; and diffraction grating elements 200BN configured to diffract the third light portion in the third wavelength band.

In addition, referring to FIG. 9, the output coupler 26g may have a three-layer structure. For example, the output coupler 26g may include: a third output coupler 330 in which diffraction grating elements 200RP configured to diffract, at a first viewing angle, a first light portion in a first wavelength band among light incident on a waveguide 22 are alternately arranged with diffraction grating elements 200RN configured to diffract, at a second viewing angle, the first light portion in the first wavelength band among the light incident on the waveguide 22; a fourth output coupler 340 in which diffraction grating elements 200GP configured to diffract, at the first viewing angle, a second light portion in a second wavelength band among light incident on the third output coupler 330 are alternately arranged with diffraction grating elements 200GN configured to diffract, at the second viewing angle, the second light portion in the second wavelength band among the light incident on the third output coupler 330; and a fifth output coupler 350 in which diffraction grating elements 200BP configured to diffract, at the first viewing angle, a third light portion in a third wavelength band among light incident on the fourth output coupler 340 are alternately arranged with diffraction grating elements 200BN configured to diffract, at the second viewing angle, the third light portion in the third wavelength band among the light incident on the fourth output coupler 340.

Figure 10:
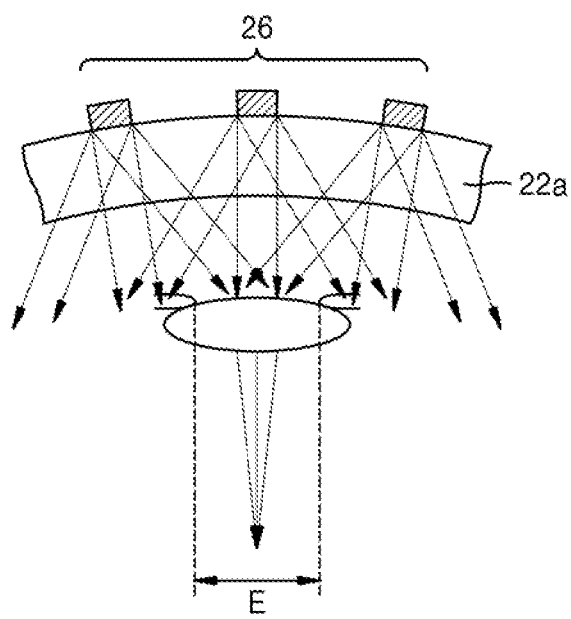
FIG. 10 is a view illustrating an optical coupler including a curved waveguide according to an embodiment.

FIG. 10 is a view illustrating an optical coupler including a waveguide 22a, which is curved according to an embodiment. Referring to FIG. 10, the waveguide 22a may be curved. When a plate-shaped output coupler as shown, e.g., in the comparative example of FIG. 3 is disposed on the curved waveguide 22a, rays of light diffracted by the plate-shaped output coupler may not travel in parallel to each other. As a result, image blurring may increase.

In an embodiment, however, an output coupler 26 having a pinhole array structure may be disposed on the curved waveguide 22a, and thus rays of light diffracted by the output coupler 26 having a pinhole array structure may travel relatively in parallel to each other. Thus, image blurring may decrease.

Figure 11:
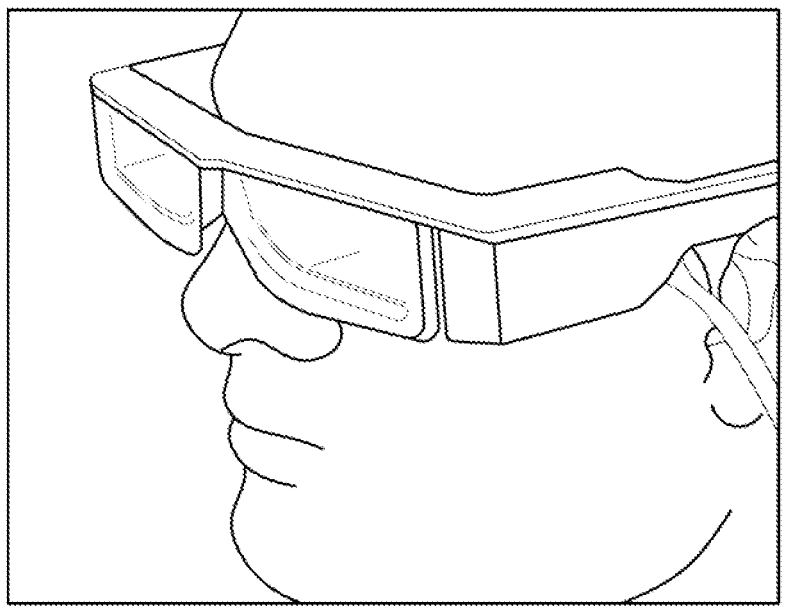
FIG. 11 is a view illustrating a type of a near-eye display apparatus according to an embodiment.

The waveguide-type display apparatus 1 described above may be a near-eye display apparatus. For example, the near-eye display apparatus may be applied to a head-mounted display (HMD). The near-eye display apparatus may be a glasses-type display apparatus or a goggles-type display apparatus. FIG. 11 is a view illustrating a type of a near-eye display apparatus according to an embodiment.

The near-eye display apparatus may be operated in conjunction (or connection) with a smartphone.

Figure 12:
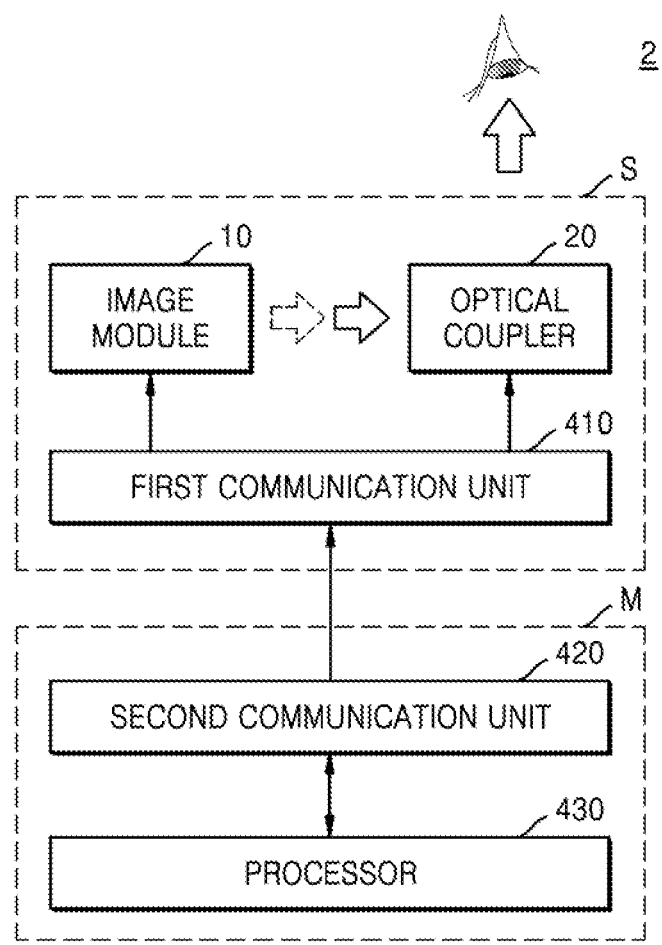
FIG. 12 is a block diagram illustrating a display apparatus according to an embodiment.

FIG. 12 is a block diagram illustrating a display apparatus 2 according to an embodiment. Referring to FIG. 12, the display apparatus 2 may include: a slave S including an image module 10, an optical coupler 20, and a first communication unit 410; and a master M including a second communication unit 420 and a processor 430. The image module 10 and the optical coupler 20 are the same as those described above, and descriptions thereof will be omitted.

The slave S may be a wearable device such as a near-eye display apparatus, and the master M may be an electronic device separate from the wearable device, such as a mobile phone or a computer.

A control command may be provided from the processor 430 to the image module 10 through the first and second communication units 410 and 420. The first and second communication units 410 and 420 may include a short-range wireless communication unit, a mobile communication unit, or the like.

A method of controlling the image module 10 by the processor 430 may be implemented as a software program including instructions stored in a storage medium, which is readable using a computer. The computer is a device capable of reading the instructions stored in the storage medium and performing operations using the instructions according to the embodiments described above, and may include any of the display apparatuses of the embodiments described above.

As described above, according to the one or more of the above embodiments, the waveguide-type display apparatus includes the output coupler having a pinhole array structure and may thus provide an increased depth of focus. Thus, images output from the waveguide may be clear.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A display apparatus comprising:
a waveguide;
an input coupler on the waveguide, the input coupler being configured to introduce light corresponding to an image into the waveguide; and
an output coupler on the waveguide, the output coupler being configured to output light traveling within the waveguide to an outside of the waveguide,
wherein the output coupler comprises a plurality of first diffraction grating elements arranged apart from each other, the plurality of first diffraction grating elements being configured to diffract a first light portion in a first wavelength band among the light traveling within the waveguide, and
wherein a gap between adjacent first diffraction grating elements from among the plurality of first diffraction grating elements is greater than a width and a length of each of the plurality of first diffraction grating elements,
wherein the plurality of first diffraction grating elements is arranged such that a pitch between the adjacent first diffraction grating elements arranged in a center region of the output coupler is less than a pitch between the adjacent first diffraction grating elements arranged in a peripheral region of the output coupler.

2. The display apparatus of claim 1, wherein the gap between the adjacent first diffraction grating elements is about two times to about five times at least one of the width and the length of each of the plurality of first diffraction grating elements.

3. The display apparatus of claim 1, wherein at least one of the width and the length of each of the plurality of first diffraction grating elements is about 100 μm to about 2 mm.

4. The display apparatus of claim 1, wherein a thickness of each of first diffraction grating elements arranged in a center region of the output coupler is greater than a thickness of each of first diffraction grating elements arranged in a peripheral region of the output coupler.

5. The display apparatus of claim 1, wherein each of the plurality of first diffraction grating elements diffracts the first light portion into a plurality of diffraction orders such that the first light portion is output in a plurality of directions.

6. The display apparatus of claim 1, wherein a size of a light beam, which is incident on a user's pupil among light diffracted by the output coupler, is less than a size of the user's pupil.

7. The display apparatus of claim 1,
wherein the output coupler further comprises:
a plurality of second diffraction grating elements arranged apart from each other, the plurality of second diffraction grating elements being configured to diffract, among the light traveling within the waveguide, a second light portion in a second wavelength band different from the first wavelength band; and
a plurality of third diffraction grating elements arranged apart from each other, the plurality of third diffraction grating elements being configured to diffract, among the light traveling within the waveguide, a third light portion in a third wavelength band different from the first wavelength band and the second wavelength band.

8. The display apparatus of claim 7, wherein the plurality of first diffraction grating elements, the plurality of second diffraction grating elements, and the plurality of third diffraction grating elements are alternatingly and repeatedly arranged.

9. The display apparatus of claim 7, wherein a gap between each first diffraction grating element from among the plurality of first diffraction grating elements and a respective adjacent second diffraction grating element from among the plurality of second diffraction grating elements is less than a width of each of the plurality of first and second diffraction grating elements.

10. The display apparatus of claim 7, wherein each diffraction grating element of the plurality of first diffraction grating elements, the plurality of second diffraction grating elements, and the plurality of third diffraction grating elements is directly in contact with the waveguide.

11. The display apparatus of claim 7, wherein each diffraction grating element of the plurality of first diffraction grating elements, the plurality of second diffraction grating elements, and the plurality of third diffraction grating elements is configured to diffract red light, green light, or blue light.

12. The display apparatus of claim 1, wherein the output coupler further comprises a plurality of fourth diffraction grating elements arranged apart from each other, the plurality of fourth diffraction grating elements being configured to diffract the first light portion, wherein the plurality of first diffraction grating elements outputs the first light portion at a first viewing angle, and wherein the plurality of fourth diffraction grating elements outputs the first light portion at a second viewing angle different from the first viewing angle.

13. The display apparatus of claim 12, wherein the plurality of first diffraction grating elements is configured to diffract the first light portion into 0th and positive diffraction orders such that the first light portion is output at the first viewing angle, and wherein the plurality of fourth diffraction grating elements is configured to diffract the first light portion into 0th and negative diffraction orders such that the first light portion is output at the second viewing angle.

14. The display apparatus of claim 12, wherein the output coupler is on a curved surface of the waveguide.

15. The display apparatus of claim 1, wherein at least one of the plurality of first diffraction grating elements has any one from among a circular cross-sectional shape, an elliptical cross-sectional shape, and a polygonal cross-sectional shape.

16. The display apparatus of claim 1, wherein the plurality of first diffraction grating elements is nano-imprinted on the waveguide.

17. The display apparatus of claim 1, wherein the waveguide transmits light corresponding to an external environment.

18. The display apparatus of claim 1, further comprising an image module configured to provide the light corresponding to the image to the input coupler.

19. The display apparatus of claim 1, wherein the display apparatus comprises a near-eye display apparatus.

* * * * *